US009253703B1

(12) United States Patent
Oroskar

(10) Patent No.: US 9,253,703 B1
(45) Date of Patent: Feb. 2, 2016

(54) METHODS AND SYSTEMS FOR CONSIDERING THE CONGESTION LEVEL OF AN INTER-BASE-STATION LINK DURING HANDOFF OF A MOBILE STATION

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 301 days.

(21) Appl. No.: 13/796,643

(22) Filed: Mar. 12, 2013

(51) Int. Cl.
*H04W 36/30* (2009.01)

(52) U.S. Cl.
CPC .................................... *H04W 36/30* (2013.01)

(58) Field of Classification Search
None
See application file for complete search history.

(56) References Cited

U.S. PATENT DOCUMENTS

| 6,603,971 | B1 | 8/2003 | Mohebbi | |
|---|---|---|---|---|
| 6,944,462 | B2 | 9/2005 | Riihinen et al. | |
| 7,076,214 | B2 | 7/2006 | Jabbary | |
| 2008/0153495 | A1* | 6/2008 | Ogami et al. | 455/436 |
| 2008/0247361 | A1* | 10/2008 | Jung et al. | 370/331 |
| 2012/0063417 | A1 | 3/2012 | Redana et al. | |
| 2014/0067984 | A1* | 3/2014 | Danilak | 709/213 |
| 2014/0119196 | A1* | 5/2014 | Hui et al. | 370/241 |

OTHER PUBLICATIONS

Application of Sachin R. Vargantwar, et al., Method and System for Managing Handoff in a Radio Access Network, U.S. Appl. No. 12/414,934, filed Mar. 31, 2009 (U.S. Pat. No. 8,254,331, issued Aug. 28, 2012).
Palat, Sudeep and Godin, Philippe, Alcatel-Lucent Strategic White Paper, The LTE Network Architecture, A Comprehensive Tutorial, 2009.
Sesia, Stefania, Toufik, Issam, and Baker, Matthew, LTE-The UMTS Long Term Evolution, From Theory to Practice, John Wiley and Sons, Ltd., 2009.
Application of Anoop K. Goyal et al., Selecting a Target Base Station Based on Congestion Levels of Inter-Base-Station Links, U.S. Appl. No. 13/633,266, filed Oct. 2, 2012.

* cited by examiner

*Primary Examiner* — Huy D Vu
*Assistant Examiner* — Bao G Nguyen

(57) ABSTRACT

Various embodiments are described for considering the congestion level of an inter-base-station link during handoff of a mobile station. In one embodiment, the source and target base stations are communicatively linked via (i) a backhaul link on which a backhaul-network entity resides and (ii) an inter-base-station link on which the backhaul-network entity does not reside. A congestion level of the inter-base-station link is determined. Furthermore, a determination is made to hand off the mobile station from the source base station to the target base station. The mobile station is handed off using the backhaul link and not the inter-base-station link if the determined congestion level of the inter-base-station link exceeds a congestion threshold.

18 Claims, 4 Drawing Sheets

METHODS AND SYSTEMS FOR CONSIDERING THE CONGESTION LEVEL OF AN INTER-BASE-STATION LINK DURING HANDOFF OF A MOBILE STATION

BACKGROUND

A typical cellular radio access system includes a radio access network (RAN) that is arranged to provide mobile stations with access to one or more transport networks such as the public switched telephone network (PSTN) and/or the Internet. The RAN may include a cellular base station (e.g., base transceiver station, access node, eNodeB, or the like), which itself may include an antenna configuration and associated equipment for radiating to define one or more coverage areas in which a mobile station can wirelessly communicate with the base station over an air interface. The cellular radio access system may further include various entities such as switches, gateways, and controllers that may facilitate connectivity with a transport network and/or may help control aspects of RAN operation such as registration and de-registration of mobile stations. For example, the cellular radio access system could include a mobile switching center (MSC), a mobility management entity (MME), a soft-switch, a media gateway controller (MGC), a packet data serving node (PDSN), a serving gateway (S-GW), and a packet data network gateway (P-GW). Further, these entities may be coupled with a signaling network to facilitate communication with other system entities such as a home location register (HLR) (e.g., a home subscriber server (HSS)) or a location-determination system, among other entities.

In practice, when a mobile station enters into coverage of the RAN, such as coverage of a base station, the mobile station may engage in a registration (e.g., attach) procedure so as to then be able to engage in bearer-data communication, perhaps to place and receive calls and engage in wireless packet-data communication, to the extent that the mobile station's service profile and capabilities allow, perhaps. During the registration procedure, the mobile station may transmit a radio-access-registration-request (e.g., attach-request) message via an air-interface uplink channel to the base station providing the coverage area. Upon receiving that registration-request message, the base station may signal to one or more other entities of the cellular radio access system, such as an MSC or MME as examples, which in turn may signal to the HLR.

After initially registering in a coverage area, a mobile station may continue to monitor the pilot signal of that coverage area as well as the pilot signals of adjacent coverage areas, and may at some point transmit to the serving base station a radio measurement report (e.g., pilot-strength-measurement message or data-rate-control message) indicating the strength of the monitored signals. If the base station determines based on such a message that an adjacent coverage area provides sufficiently stronger coverage than the currently serving coverage area, the base station may arrange for a handoff of the mobile station to the adjacent coverage area.

OVERVIEW

To initiate a handoff of a mobile station to a target base station, a source base station may send a handover-request message to the target base station, which in turn may accept the handoff request by sending a handover-request-acknowledgment message to the source base station. Upon receiving the handover-request-acknowledgment message, the source base station may send to the mobile station a handoff-direction message, indicating to the mobile station that subsequent air-interface communication should be conducted via the target-base-station coverage area. The source base station may also forward downstream bearer data to the target base station, perhaps via an inter-base-station link (e.g., an X2 link) between the source and target base stations, until the source base station receives a release-resource message (described below) from the target base station. The forwarded data can then be sent to the mobile station once it begins operating on the target-base-station coverage area.

The source base station may also send to the target base station via the inter-base-station link a locally-stored service-profile record of the mobile station. The service profile (e.g., a UE context) may indicate parameters that the base station (and the RAN) can use to locate, identify, and communicate with the mobile station associated with that service profile. The service profile record may include, for example, user-subscription information, mobile-station capabilities, and/or a list of communication sessions established with the mobile station.

Upon receiving a handover-complete message from the mobile station and receiving the service profile from the source base station, the target base station may send a path-switch-request message to an S-GW to request that downstream bearer data destined for the mobile station be directed to the target base station (rather than to the source base station). The target base station, upon receiving a path-switch-request-acknowledgement message from the S-GW, indicating that downstream bearer data has been redirected to the target base station, may then send a resource-release message to the source base station, indicating that the source base station may release any resources still allocated to the mobile station. And it should be noted that this messaging sequence is provided by way of example, and that other messaging sequences, protocols, and the like could be used in various different contexts to accomplish handover.

In LTE networks among other examples, the service profile associated with a mobile station is sent from the source base station to the target base station typically via an air-interface link that directly connects the two base stations. The two base stations are also generally able to communicate with one another via a respective (and typically wired) communication link on what is known as the "backhaul" side of each respective base station. For a variety of reasons (e.g., potential for latency, dedication to (or at least prioritization for) other uses, and the like), however, in current implementations, a source base station would not transmit handoff-related context information (e.g., the aforementioned service profile) to a target base station on the backhaul side unless the above-mentioned air-interface link is not operable at the time.

However, advantages may be realized in some circumstances by sending such context information over the backhaul link instead of the air-interface link. For example, congestion of the air-interface link may result in latency that is greater than the latency inherent in communication via the backhaul link. Current implementations do not consider the congestion level of the air-interface link when selecting the link via which to send the context information. To address this and other drawbacks of prior implementations, the various embodiments that are described herein take into account the congestion level of an inter-base-station link during handoff of a mobile station when a source base station is communicatively linked with a target base station via both the inter-base-station link and a backhaul link.

In one embodiment, a RAN includes a source base station (that initially is serving a mobile station) and a target base station. The base stations are communicatively linked via (i)

a backhaul link on which a backhaul-network entity resides and (ii) an inter-base-station link on which the backhaul-network entity does not reside. A network entity of the RAN determines a congestion level of the inter-base-station link. The RAN further determines to hand off the mobile station from the source base station to the target base station, and responsively hands off the mobile station using the backhaul link and not the inter-base-station link if the determined congestion level exceeds a congestion threshold.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended by way of example and not limitation.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

I. Exemplary Radio Access Network

Figure 1:
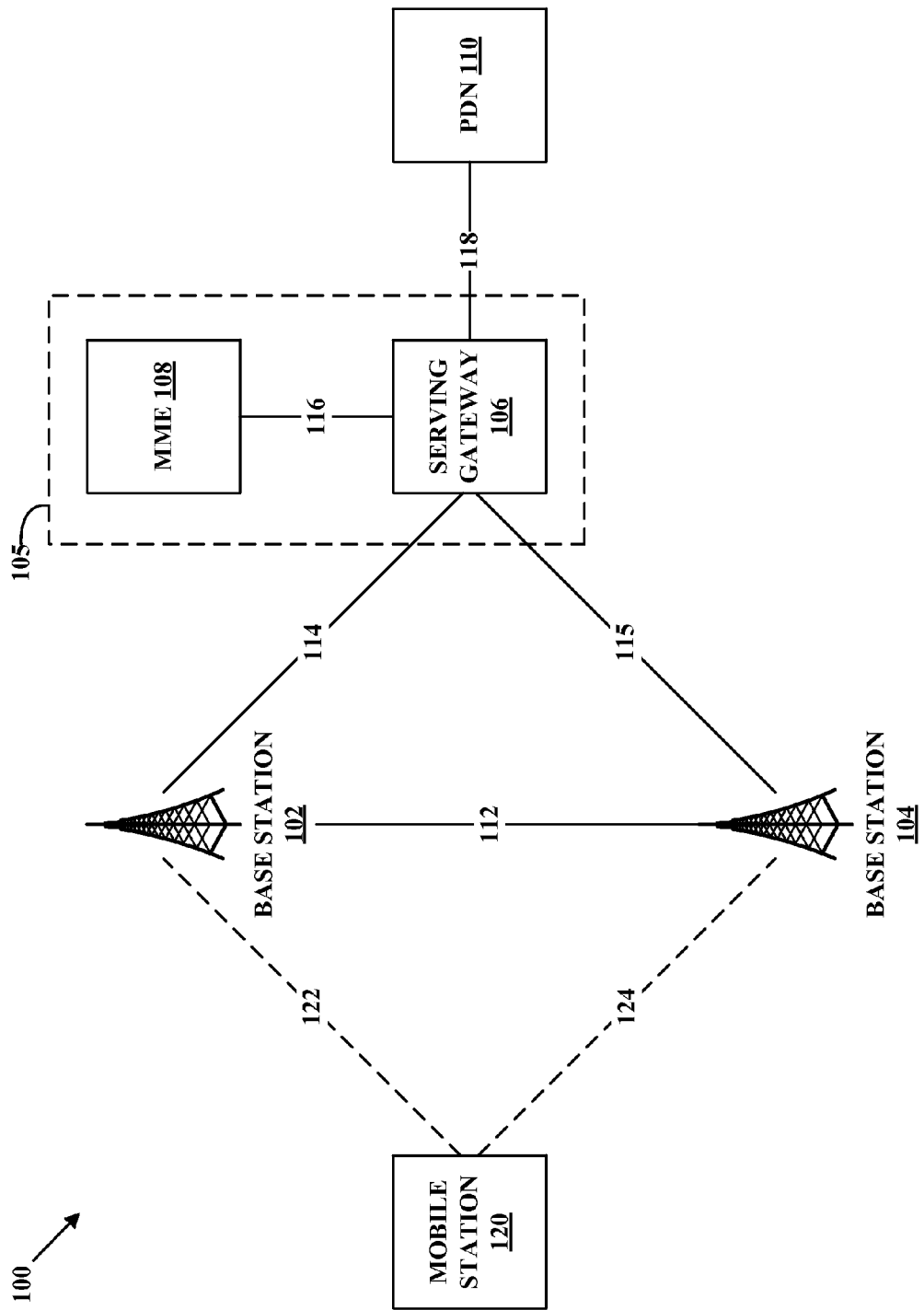
FIG. 1 is a simplified block diagram of a RAN in which aspects of the present disclosure can be implemented.

FIG. 1 is a simplified block diagram of a RAN in which aspects of the present disclosure can be implemented. As shown in FIG. 1, RAN 100 includes base stations 102 and 104, and backhaul-network entities 105, which include MME 108 and serving gateway 106 communicatively connected to packet-data-network gateway 110. Each of the entities in RAN 100 are interconnected by way of links 112, 114, 115, 116, and 118, and mobile station 120 is communicatively connected to RAN 100 via at least one of links 122 and 124. The RAN could take the form of an LTE core network (CN) or evolved packet system (EPS), to name just a few examples. The entities of the RAN may cooperatively function, for example, to provide mobile station 120 with connectivity to packet-data network 110 by routing traffic between the mobile station and the network, among other possibilities.

Those having skill in the art will understand that different and/or additional entities may be present in RAN 100, and that not all entities depicted in FIG. 1 are necessary to practice the described embodiments. For example, RAN 100 could include additional base stations and/or serving gateways. Base stations 102 and 104 may function, for example, to provide mobile station 120, and possibly additional mobile stations, with connectivity to RAN 100. The base stations may operate according to a defined air-interface protocol such as CDMA, LTE, WiMAX, and/or GSM, and mobile station 120 may operate according to the same air-interface protocol to enable and facilitate communicating with one or more of the base stations and gaining access to one or more transport networks (such as packet-data network 110) via RAN 100. One or both of base stations 102 and 104 may be communicatively connected to mobile station 120 via air-interface links 122 and 124, respectively, and may be communicatively connected to one or more backhaul-network entities 105 by way of backhaul links 114 and 115, respectively.

Serving gateway 106 may function, for example, to facilitate transfer of voice and data communication between packet-data network 110 and base stations 102 and 104 (and the mobile stations connected to those base stations, such as mobile station 120). During a handoff of mobile station 120 from base station 102 to base station 104, for example, serving gateway 106 may redirect, to the target base station 104 (as opposed to the source base station 102), traffic coming from the packet data network and destined for mobile station 120. The serving gateway 106 may also buffer communication from the packet data network 110 while RAN 100 (and perhaps target base station 104, specifically) establishes an air-interface link with mobile station 120.

MME 108 may function, for example, to establish one or more communication sessions between RAN 100 and mobile station 120, and may further maintain and tear down those communication sessions as necessary. The MME may also handle signaling between the RAN and the mobile station.

Packet-data network 110 could take the form of the Internet, an intra- or inter-RAN voice over IP (VoIP) network, and/or another type of network, as examples.

Inter-base-station link 112 may be a link communicatively connecting base stations 102 and 104. In an embodiment, a backhaul-network entity 105 does not reside on inter-base-station link 112. Rather, for example, inter-base-station link 112 may communicatively connect base stations 102 and 104 directly via a physical-layer air-interface link between the base stations. As another possibility, inter-base-station link 112 may be a logical-layer link on which no logical-layer backhaul-network entity resides, but which is transported via a physical-layer (or lower-level logical layer) backhaul link on which a backhaul-network entity does reside. Inter-base-station link 112 could also be a link-layer link, an Internet (IP)-layer link, a transport-layer link, a radio network-layer link (such as an X2 link), or an application-layer link, as examples. Those having skill in the art will recognize that inter-base-station link 112 may take other forms as well.

In addition to inter-base-station link 112, backhaul links 114 and 115 may communicatively link base stations 102 and 104. In an embodiment, a backhaul-network entity resides on one or both of backhaul links 114 and 115. For example, as shown in FIG. 1, backhaul network entity 105 (and specifically serving gateway 106) resides on an end of backhaul links 114 and 115 opposite of base stations 102 and 104, respectively. As noted above, the backhaul-network entity could be a physical-layer entity and/or a logical-layer entity, among other possibilities known to those having skill in the art.

Links 112, 114-116, 118, 122, and/or 124 could each take the form of one or more links. For example, a backhaul link communicatively connecting base stations 102 and 104 may include backhaul links 114 and 115, each of which communicatively connects base stations 102 and 104, respectively, to backhaul-network entity 105.

The links could be wired and/or wireless physical links A wired link could take the form of a coaxial or fiber optic cable operating according to standards for T1, Ethernet, ISDN, and/or DSL, as examples, while a wireless link could take the form of a Wi-Fi, Bluetooth, GSM, LTE, and/or 1xRTT link, among numerous other possibilities. The links could be logical-layer links (in addition to or instead of physical-layer links), and could take the form of one or more packets/datagrams (e.g., IP), and/or communication sessions (perhaps comprising one or more related packets, e.g., TCP). Further, a logical-layer communication session could be LTE-specific: an Si interface is often used for communication between a base station and a backhaul network entity (as well as for communication among backhaul-network entities), and an X2 interface is often used for communication between two or more base stations.

II. Exemplary Operation

Figure 2:
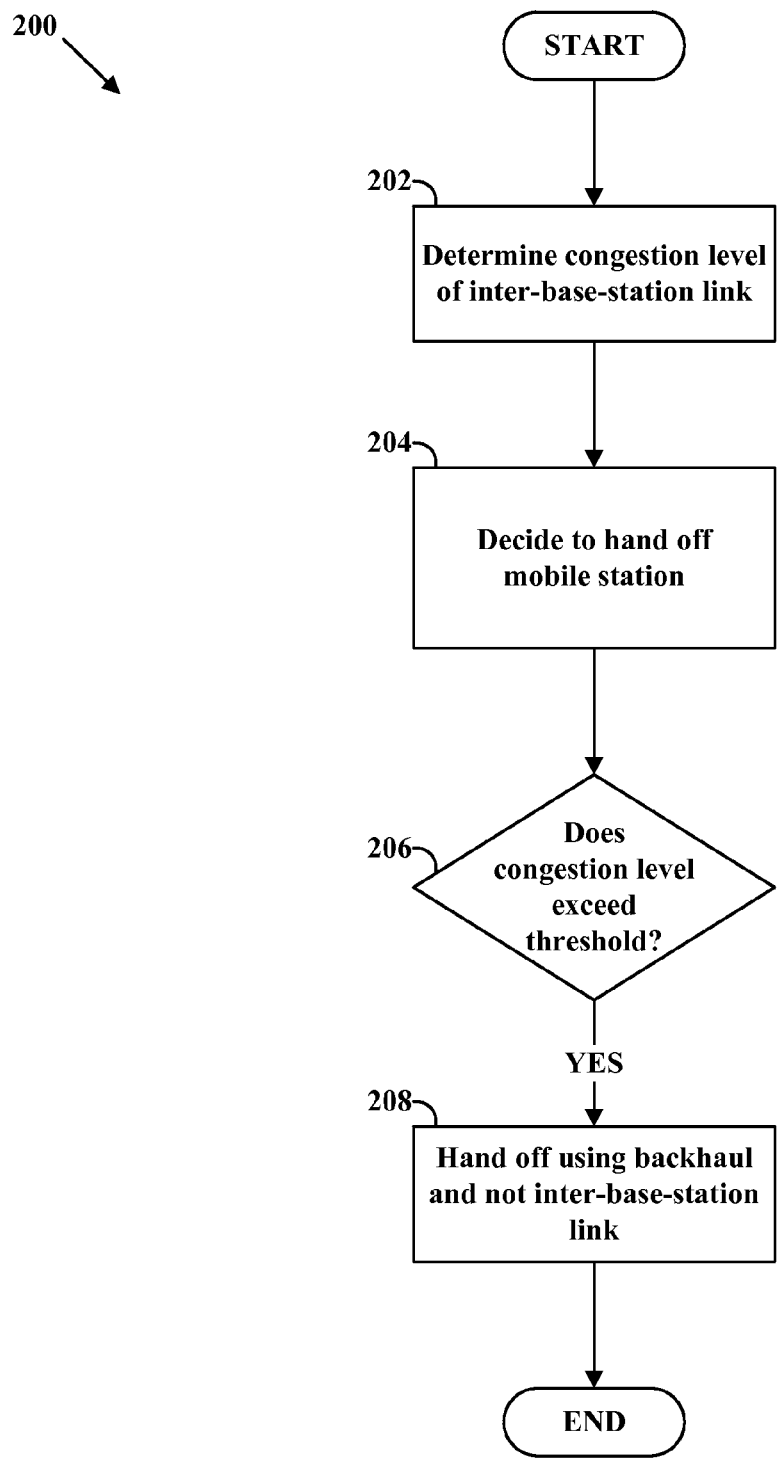
FIG. 2 is a flowchart of a method, in accordance with at least one embodiment.

FIG. 2 is a flowchart of a method, in accordance with exemplary embodiments. Though the method is described as being carried out by source base station 102 (that initially is serving mobile station 120, those having skill in the art will understand that the method may be carried out by any other entity or entities, such as target base station 104, backhaul-network entity 105 (including serving gateway 106 and/or MME 108), or mobile station 120, among numerous other possibilities.

Method 200 begins at step 202 with base station 102 determining a congestion level of inter-base-station link 112. In an embodiment, the congestion level of inter-base-station link 112 could be or at least include (e.g., reflect) a throughput of inter-base-station link 112. The throughput could be measured by the number of communications delivered via the inter-base-station link 112 per unit time. Therefore, the throughput could be measured by the number of packets per second, packets per time slot, or bits per second (bit/s or bit rate), among numerous other options. A higher throughput may correspond to a lower congestion level, while a lower throughput may correspond to a higher congestion level.

As another possibility, the congestion level could be or at least include (e.g., reflect) a latency of inter-base-station link 112. The latency could be measured by the time it takes for a packet or other communication sent from source base station 102 to reach target base station 104. A higher latency may correspond to a higher congestion level. Latency is different from throughput, and a low-throughput link could still have little latency; that is, the link may be able to deliver small amounts of data (low throughput) within a short period of time (low latency).

As yet another possibility, the congestion level could be or at least include (e.g., reflect) a rate at which packets or other communications are corrupted and/or lost while carried by inter-base-station link 112. These levels may be measured differently at different layers of communication. For example, target base station 104 may detect (perhaps by using a checksum) that bits of a packet received via an IP-link layer were corrupted, and may accordingly discard the packet, which therefore would not be passed to a higher layer such as a transport layer. The same error could be measured by a corruption rate at the link layer and as a loss rate at the transport layer, as examples.

As still another possibility, the congestion level could be or at least include (e.g., reflect) jitter, generally defined as a measure (in time) of the deviation from an average latency of the link. For example, the jitter of inter-base-station link 112 would be low if the latency of the link remained constant, even if the latency remained constantly high. A higher jitter may correspond to a higher congestion level. In practice, the selection of a bitrate or compression level for a communication may depend on the latency of the data. Selecting an appropriate bitrate or compression level could be difficult (or impossible) if the jitter of the inter-base-station link is high.

The congestion level could also be or at least include (e.g., reflect) a rate at which (or extent to which) packets or other communications sent via inter-base-station link 112 are delivered out-of-order. Out-of-order packets received via a congested inter-base-station link 112 may need to be stored at target base station 104 until the packets can be re-arranged for decoding (and possibly delivery to mobile station 120). Delay in delivery of a service profile or other information could increase the amount of time required for a handoff of mobile station 120 from source base station 102 to target base station 104, and could even possibly result in dropped calls.

At step 204, source base station 102 determines to hand off mobile station 120 to target base station 104. In an embodiment, the determination to hand off the mobile station may occur in response to detecting a trigger to handoff mobile station 120. The trigger could be a determination, a request, and/or an instruction by source base station 102, mobile station 120, serving gateway 106, MME 110, and/or any other entity, among numerous other examples of possible handoff-triggering events known to those having skill in the art.

In response to making the determination at step 204, first base station 102 hands off mobile station 120 using backhaul links 114 and 115, and not inter-base-station link 112, if the determined congestion level exceeds a congestion threshold. In one embodiment, as shown in FIG. 2, first base station 102 hands off mobile station 120 using backhaul links 114 and 115, and not inter-base-station link 112, at step 208 if the first base station determines at step 206 that the congestion level exceeds the determined congestion threshold.

Handing off the mobile station using backhaul links 114 and 115, and not inter-base-station link 112, could include sending data using the backhaul links 114 and 115 and not the inter-base-station link 112. That data could be or at least include, as examples, the above-described service profile, bearer-data communication, or any other type of data, as will be understood by those having skill in the art.

In an embodiment, handing off mobile station 120 using backhaul links 114 and 115 (and not inter-base-station link 112) could include determining that one or more other factors, in addition to the above-described congestion level, satisfies one or more criteria. Other factors could include the load of either source base station 102 or target base station 104, a congestion level of backhaul links 114 and 115, and/or the strength of inter-base-station link 112, among other possibilities. Further, the congestion threshold may be adjusted based on whether other factors are considered, and/or based on the criteria each factor must satisfy (such as a minimum power level of inter-base-station link 112 and/or a maximum congestion level of backhaul link 114 and/or 115, as examples).

III. Exemplary Mobile Station

Figure 3:
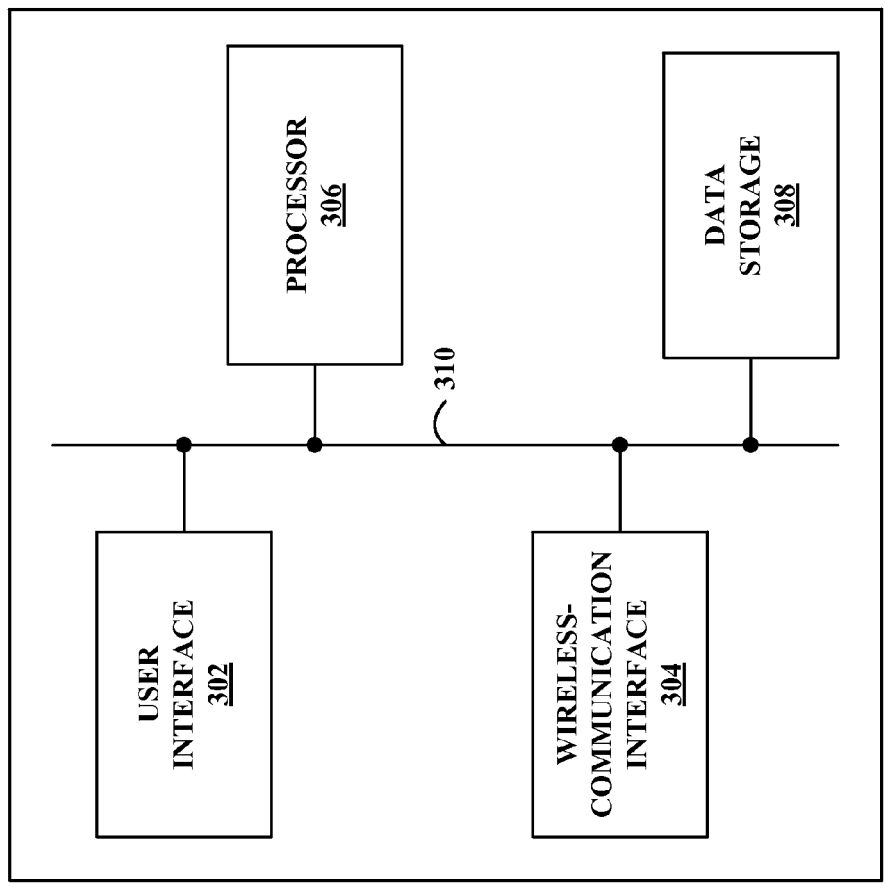
FIG. 3 is a simplified block diagram of a mobile station with which aspects of the present disclosure can be implemented.

FIG. 3 is a simplified block diagram of a mobile station with which aspects of the present disclosure can be implemented. As shown, mobile station 120 includes a user interface 302, a wireless-communication interface 304, a processor 306, and data storage 308, all of which may be coupled together by a system bus, network, or other communication mechanism 310.

User interface 302 may include one or more input devices such as a touchscreen, one or more buttons, a microphone, and the like for receiving inputs from users, as well as one or more output devices such as a display, one or more indicator lights, a speaker, and the like for communicating outputs to users. Wireless-communication interface 304 may comprise one or more antennae and one or more chipsets for communicating with one or more base stations over respective air interfaces. As an example, one such chipset could be one that is suitable for CDMA communication. As another example, one such chipset could be one that is suitable for LTE communication. The chipset or wireless-communication interface in general may also or instead be arranged to communicate according to one or more other types (e.g., protocols) mentioned herein and/or any others now known or later developed.

Processor 306 may comprise one or more general-purpose processors and/or one or more special-purpose processors, and may be integrated in whole or in part with wireless-communication interface 304. Data storage 308 may comprise one or more volatile and/or non-volatile storage components (such as magnetic, optical, flash, or other non-transitory storage), and may be integrated in whole or in part with processor 306. And numerous other configurations are possible. Data storage 308 may contain program instructions executable by processor 306 for carrying out various mobile-station functions described herein.

IV. Example Network Entity

Figure 4:
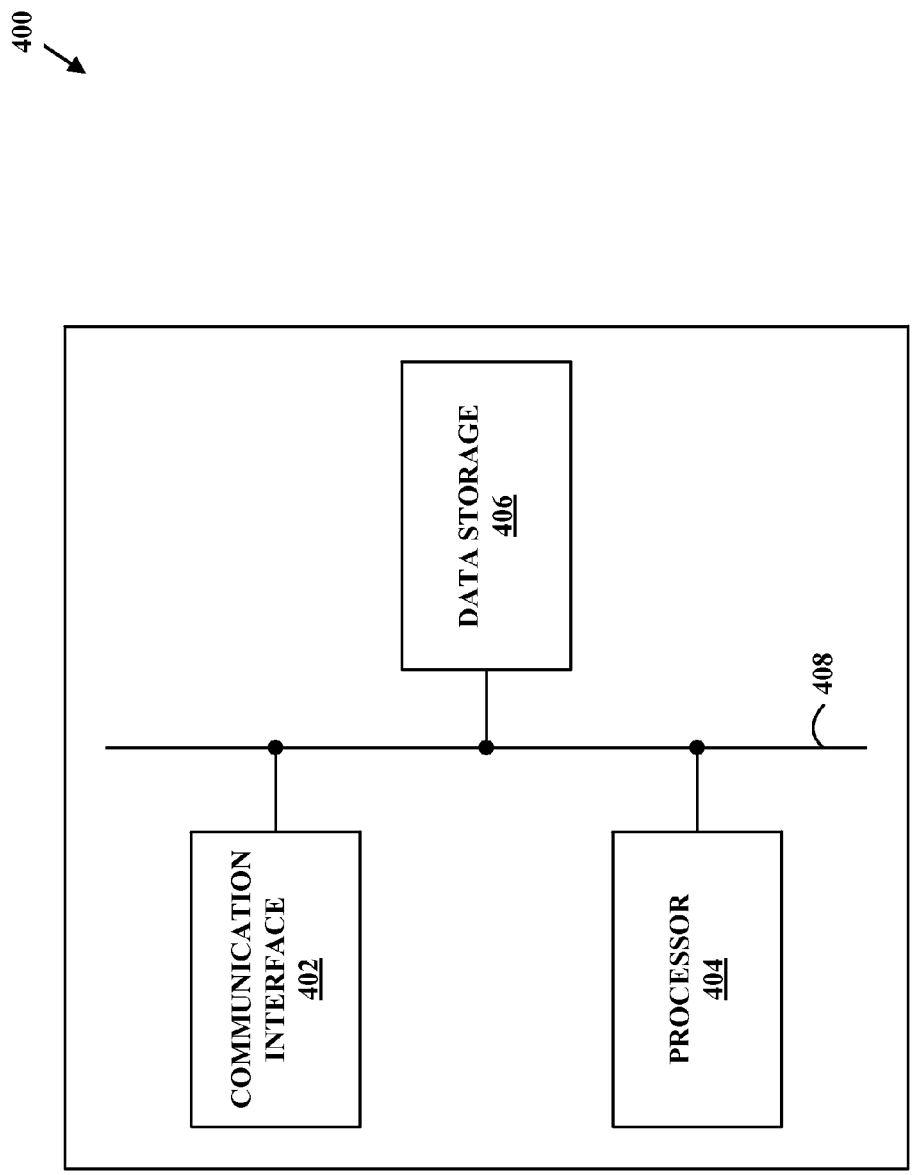
FIG. 4 is a simplified block diagram of a network entity with which aspects of the present disclosure can be implemented.

FIG. 4 is a block diagram of a network entity, in accordance with one or more embodiments. As shown, network entity 400 includes a communication interface 402, a processor 404, and data storage 406, all of which may be coupled together by a system bus, network, or other communication mechanism 408. The example network entity 400 could represent the structure and arrangement of one or more of base station 102, base station 104, backhaul-network entity 105 (including serving gateway 106 and/or MME 110), mobile station 120, a packet-data-network gateway, any entity capable of carrying out the network-entity functions described herein, or any combination of these, among other possibilities.

Communication interface 402 may include one or more interfaces (e.g., an Ethernet card) for engaging in wired communication and/or one or more interfaces (e.g., a Wi-Fi interface) for engaging in wireless communication. Processor 404 may comprise one or more general-purpose processors and/or one or more special-purpose processors, and may be integrated in whole or in part with communication interface 402. Data storage 406 may comprise one or more volatile and/or non-volatile storage components (such as magnetic, optical, flash, or other non-transitory storage), and may be integrated in whole or in part with processor 404. Other configurations are possible without departing from the scope of the claims. Data storage 406 may contain program instructions executable by processor 404 for carrying out various network-entity functions described herein. Network entity 400 may also have a user interface and/or one or more other components deemed suitable for various contexts.

V. Conclusion

While some example embodiments have been described above, those of ordinary skill in the art will appreciate that numerous changes to the described embodiments could be made without departing from the scope and spirit of the claims.

What is claimed is:

1. In a radio access network (RAN) comprising a first base station and a second base station, the first base station initially serving a mobile station, and the first and second base stations being communicatively linked via (i) a backhaul link on which a backhaul-network entity resides and (ii) an inter-base-station link on which the backhaul-network entity does not reside, a method comprising:
   determining a congestion level of the inter-base-station link; and
   determining to hand off the mobile station from the first base station to the second base station and responsively handing off the mobile station from the first base station to the second base station, wherein handing off the mobile station from the first base station to the second base station includes transferring data for the mobile station from the first base station to the second base station, wherein the data for the mobile station comprises data selected from the group consisting of a service profile record of the mobile station and downstream bearer data for the mobile station,
   wherein, when the determined congestion level of the inter-base-station link exceeds a congestion threshold, the transferring of the data for the mobile station is via the backhaul link rather than via the inter-base-station link.

2. The method of claim 1, wherein the inter-base-station link is a link selected from the group consisting of a link-layer link, an Internet-layer link, a transport-layer link, a radio network-layer link, and an application-layer link.

3. The method of claim 2, wherein the radio network-layer link comprises an X2 link.

4. The method of claim 1, wherein the backhaul-network entity comprises one or more entities selected from the group consisting of a serving gateway and a mobility management interface.

5. The method of claim 1, wherein the congestion level reflects one or more metrics selected from the group consisting of throughput, latency, packet-corruption rate, packet-loss rate, jitter, and out-of-order packet-delivery rate.

6. The method of claim 1, wherein determining to hand off the mobile station is carried out in response to encountering at least one handoff trigger.

7. The method of claim 1, carried out by the first base station.

8. The method of claim 1, carried out by the mobile station.

9. The method of claim 1, wherein the RAN operates according to a long-term evolution (LTE) wireless-communication protocol.

10. In a radio access network (RAN) comprising a first base station and a second base station, the first and second base stations being communicatively linked via (i) a backhaul link on which a backhaul-network entity resides and (ii) an inter-base-station link on which the backhaul-network entity does not reside, at least one network entity comprising:
   a processor; and
   data storage containing instructions executable by the processor for carrying out a set of functions when the first base station is initially serving a mobile station, the set of functions including:
     determining a congestion level of the inter-base-station link; and
     determining to hand off the mobile station from the first base station to the second base station and responsively handing off the mobile station from the first base station to the second base station, wherein handing off the mobile station from the first base station to the second base station includes transferring data for the mobile station from the first base station to the second base station, wherein the data for the mobile station comprises data selected from the group consisting of a service profile record of the mobile station and downstream bearer data for the mobile station, wherein, when the determined congestion level of the inter-base-station link exceeds a congestion threshold, the transferring of the data for the mobile station is via the backhaul link rather than via the inter-base-station link.

11. The at least one network entity of claim 10, wherein the inter-base-station link is a link selected from the group consisting of a link-layer link, an Internet-layer link, a transport-layer link, a radio network-layer link, and an application-layer link.

12. The at least one network entity of claim 11, wherein the radio network-layer link comprises an X2 link.

13. The at least one network entity of claim 10, wherein the backhaul-network entity comprises one or more entities selected from the group consisting of a serving gateway and a mobility management interface.

14. The at least one network entity of claim 10, wherein the congestion level reflects one or more metrics selected from the group consisting of throughput, latency, packet-corruption rate, packet-loss rate, jitter, and out-of-order packet-delivery rate.

15. The at least one network entity of claim 10, wherein handing off the mobile station from the first base station to the second base station comprises the first base station sending to the second base station a service-profile record associated with the mobile station.

16. The at least one network entity of claim 10, wherein determining to hand off the mobile station is carried out in response to encountering at least one handoff trigger.

17. The at least one network entity of claim 10, wherein the at least one network entity comprises the first base station.

18. The at least one network entity of claim 10, wherein the RAN operates according to a long-term evolution (LTE) wireless-communication protocol.

* * * * *